United States Patent [19]

Ethridge

[11] Patent Number: 4,996,017
[45] Date of Patent: Feb. 26, 1991

[54] NEUTRON GENERATOR TUBE

[75] Inventor: D. Ray Ethridge, Houston, Tex.

[73] Assignee: Halliburton Logging Services Inc., Houston, Tex.

[21] Appl. No.: 730,254

[22] Filed: May 3, 1985

Related U.S. Application Data

[63] Continuation of Ser. No. 353,832, Mar. 1, 1982, abandoned.

[51] Int. Cl.$^5$ .............................................. G21B 1/02
[52] U.S. Cl. ...................................... 376/116; 376/150
[58] Field of Search ............... 376/108, 109, 110, 111, 376/113, 114, 115, 116, 117, 119, 150, 151, 190, 199

[56] References Cited

U.S. PATENT DOCUMENTS

| | | | |
|---|---|---|---|
| 2,211,668 | 8/1940 | Penning | 376/116 |
| 2,982,858 | 5/1961 | Hoyer et al. | 376/116 |
| 3,020,408 | 2/1962 | Martin et al. | 376/109 |
| 3,107,210 | 10/1963 | Mallinckrodt | 376/151 |
| 3,112,401 | 11/1963 | Van Dorsten et al. | 376/116 |
| 3,141,975 | 7/1964 | Carr | 376/151 |
| 3,185,849 | 5/1965 | Hoyer et al. | 376/119 |
| 3,546,512 | 12/1970 | Frentrop | 376/116 |
| 3,569,756 | 3/1971 | Reifenschweller | 376/117 |
| 4,311,912 | 1/1982 | Givens | 376/117 |

Primary Examiner—Charles T. Jordan
Assistant Examiner—Richard W. Wendtland
Attorney, Agent, or Firm—William J. Beard

[57] ABSTRACT

A neutron generating system comprising a hermetically sealed housing containing an ionizable gas and a ring anode and target cathode of a Penning ion source. The housing is provided with a recess axially oriented relative to the ring anode and target cathode and adapted to accept a removable samarium/cobalt magnet such that degassing and sealing of the housing can be performed in the absence of the permanent magnet. The cathode target is an OHFC copper rod of substantially the same cross-sectional area as the target with one polished end of the rod containing a titanium film within the housing to serve as the target and the other end of the rod extending out of the housing such as to remove thermal energy from the target during operation. An ion screen between the anode ring and cathode target containing an axially positioned gridded aperture provides a broad ion beam of reduced power per unit area. Optionally, a means to control the potential on this ion screen is provided to assist in ignition of the ion source. Such a system is particularly useful in oil and gas well logging procedures.

12 Claims, 3 Drawing Sheets

NEUTRON GENERATOR TUBE

This patent is a continuation of application 06/353,832 filed Mar. 1, 1982 now abandoned.

BACKGROUND OF THE INVENTION

1. Field of the Invention

This invention relates to a neutron generating system. More specifically, the invention relates to a new and improved neutron generator tube especially adapted to traverse the narrow confines of a well or borehole for well logging purposes.

2. Description of the Prior Art

Over four decades have passed since F. M. Penning disclosed a neutron generator in U. S. Pat. No. 2,211,668 constructed of a low pressure deuterium-filled envelope containing a cathode and anode with an axially oriented magnetic field ion source, a nuclear reaction producing target and one or more acceleration electrodes. For the last three decades this "Penning" ion source has been employed extensively in various neutron generator tubes for downhole oil and gas well neutron logging. During this period extensive modifications and improvements have been suggested with varying degrees of commercial success, yet specific problems still remain, particularly during well logging in deep wells at high temperatures.

It is generally known that the permanent magnetic materials used in the conventional neutron generator tubes tend to lose their magnetic properties when subjected to temperatures such as 400° C. or greater (see U.S. Pat. Nos. 3,546,512 and 3,756,682). Because of the small confines of a well borehole, the neutron generator tube must have extremely high magnetic field capabilities in a relatively high vacuum in order to have significant ion production. In order to prevent or eliminate outgassing within the tube during use in deep, high temperature wells, an ultra high temperature bake out is necessary during fabrication of the tube. This creates the pragmatic dilemma; i.e., if an external magnet or field is employed (separate from the neutron generator tube) the physical dimensions of the resulting well logging tool restricts its utility, and if an internal permanent magnet is employed, the bake out procedure again will either restrict the physical size or deleteriously affect the magnetic field strength.

Another historically recognized problem which continues to pragmatically limit the contemporary neutron generator tube is the removal of thermal energy from the target surface of the tube. Thus it is known that the energy of the ion beam striking the target and inducing the desired nuclear reaction, if too intense, will result in high temperature sputtering and thermal failure of the target and thus failure of the neutron generator tube. Various methods of modifying the composition and the thickness of the hydrogen occluding target film have been proposed to compensate for this problem. In a recent U.S. Pat. No. 3,784,824, vapor deposition or sputtering of a non-occluder for hydrogen onto the target during operation was suggested; yet, the problem essentially remains as a critical limitation. It is also generally recognized that shielding or confining the magnetic field to the ion source by encapsulating the permanent magnet and ion source and allowing the ion to escape through an aperture creating a narrow intense ion beam (see U.S. Pat. No. 3,112,401) is a desirable practice. In contrast, U.S. Pat. Nos. 3,141,975 and 3,401,264 employ one or more ion beam grids (with and without variable potential) placed between the ion source and target. In this approach the ion beam optics are manipulated across a relatively large cross-sectional ion beam such that the ion path is completely defocused and linear, thus allowing for a low energy acceleration of the positive ions.

However, up to this time the combination of optimum thermal energy removal from the target surface and uniform distribution of the ion beam energy impinging on the target per unit surface area has been beyond contemporary technology.

SUMMARY OF THE INVENTION

In view of the prior art methods and apparatus and their associated limitations, I have discovered a neutron generating system and an associated improved neutron generator tube comprising:

(a) a hermetically sealed housing containing an ionizable gas;

(b) an axial recess in one end of the housing to accept a removable magnet;

(c) a ring anode axially oriented within the housing adjacent to the recessed end for accepting the magnet;

(d) an axially oriented thermal conductor cathode penetrating through the other end of the housing wherein the inner surface of the cathode contains a target;

(e) an ion screen near the anode ring and between the anode ring and cathode target wherein the ion screen contains an axially positioned gridded aperture; and (f) an electron shield near the cathode target and between the ion screen and cathode target wherein the electron shield contains an axially positioned aperture.

The neutron generating system of the present invention further comprises a removable magnet adapted to fit into the axial recess which in the preferred embodiment is a samarium/cobalt magnet. The invention also provides that the thermal conductor cathode have a cross-sectional area of substantially the same size as the target, and that the end of the cathode containing the target be within the housing such as to remove thermal energy from the target.

The present invention further provides that the ion screen be an electrically conductive, grounded surface and in a preferred embodiment the gridded aperture be a screen of etched tungsten of about 0.002 to 0.005 inch thick with the openings representing about 90 percent of the surface area. In an alternative embodiment, a means is provided to vary the electrical potential on the ion screen relative to the potentials of the ring anode and cathode such as to assist in ignition of the ion source.

It is a primary object of the present invention to provide a neutron generating system and tube that is compatible with the hostile high temperatures and pressures associated with downhole well logging. It is a further object that the device be compatible with extremely small diameter well casing and borehole diameter of deep wells. It is an object of the invention to provide a removable magnet such that the tube can be baked out under vacuum and hermetically sealed without subjecting the permanent magnet to ultra-high temperatures. It is also an object of the invention to provide a means for removing thermal energy from the target thus reducing thermal effects on the neutron output. And it is an object of the invention to provide a means of producing a broad ion beam of reduced power per unit area impinging on the target. Fulfillment of these objects and the presence and fulfillment of other objects shall be apparent upon complete reading of the specification and claims in conjunction with the attached drawing.

DESCRIPTION OF THE PREFERRED EMBODIMENTS

The neutron generating system and the associated improved neutron generator tube of the present invention can perhaps be best explained and understood by reference to the accompanying drawing.

Figure 1:
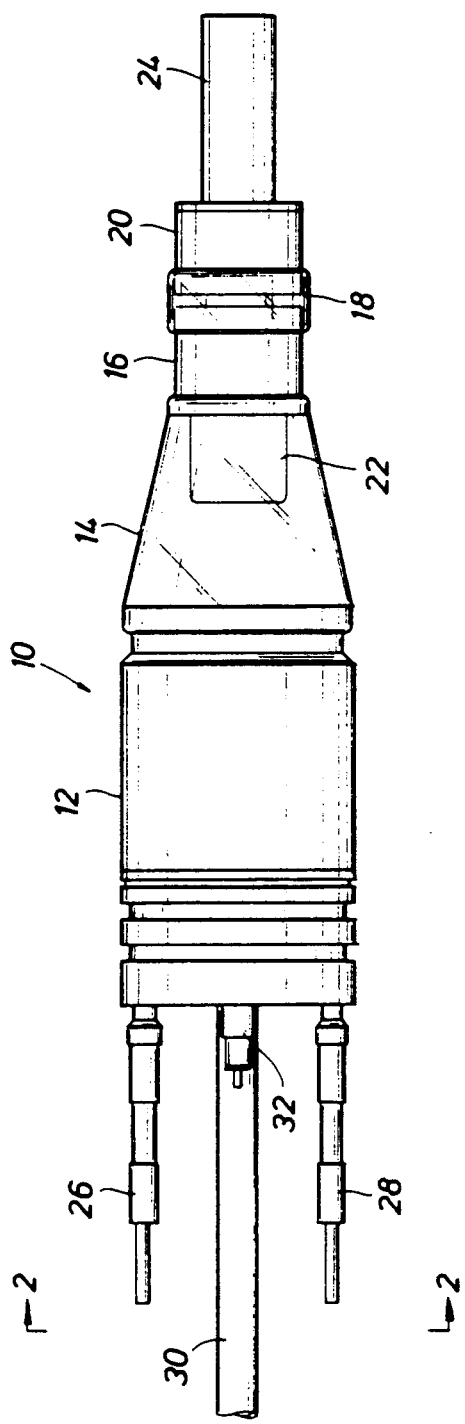
FIG. 1 is an exterior side view of a preferred neutron source tube according to the present invention.
Figure 2:
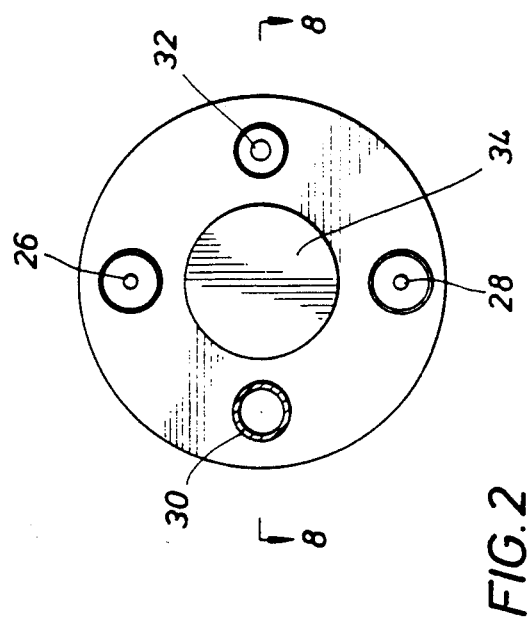
FIG. 2 is an end view of the neutron source tube of FIG. 1 as seen through line 2—2.

FIG. 1 illustrates a side view of a preferred neutron generator tube involving a cylindrically symmetric housing or sealed envelope generally designated by the numeral 10. The overall housing 10 is made up of an ion source enclosure 12 on the left, a frustro-conical high voltage insulator 14, a secondary electron emission suppressor electrical contact 16, a target insulator 18, and a target thermal conductor enclosure 20. Through the transparent high voltage insulator 14 the polished exterior surface of the secondary electron emission suppressor 22 can be seen. On the right and extending out of the housing 10 is the target thermal conductor 24. On the left and also extending out of the housing 10 are a pair of anode electrical terminals 26 and 28, a gas pumping tube 30, and an ion source gas replenishing terminal 32. Centrally located in the end of the housing 10 and as illustrated in FIG. 2 is a cylindrical recess or hole 34 for accepting a removable magnet.

Figure 3:
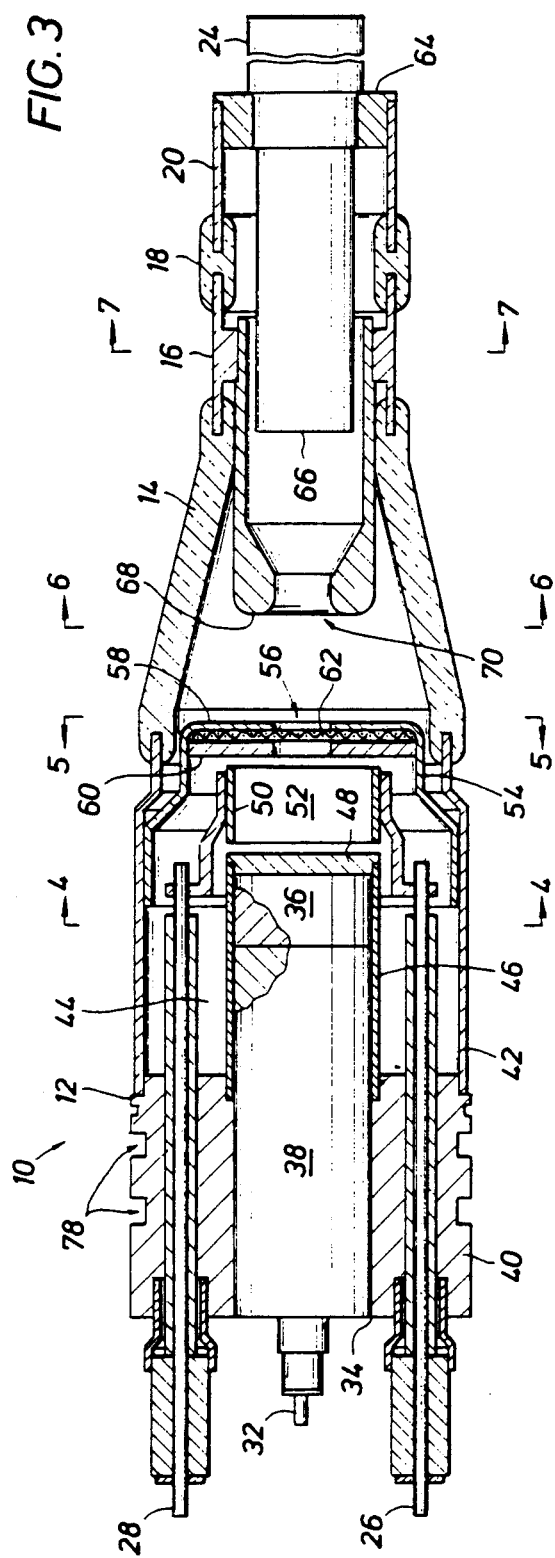
FIG. 3 is an enlarged cross-sectional side view of a preferred neutron source tube similar to FIG. 1 with removable magnet.

FIG. 3 illustrates a partial cut-away view of a neutron generator tube, again generally designated by the numeral 10, very similar to the tube of FIG. 1 except a permanent magnet 36 and magnetic pole piece 38 are positioned within the recess 34. FIG. 3 has been rotated 180° about the axis of the tube to illustrate the symmetry of the tube. The housing 10 can again be seen to be made up of an ion source enclosure 12, a high voltage insulator 14, a secondary electron emission suppressor electrical contact 16, a target insulator 18, and a target thermal conductor enclosure 20. As illustrated the ion source enclosure is made up of a header 40 and a hollow cylindrical tubular piece 42 that attaches to the larger end of the frustro-conical glass high voltage insulator 14.

Figure 4:
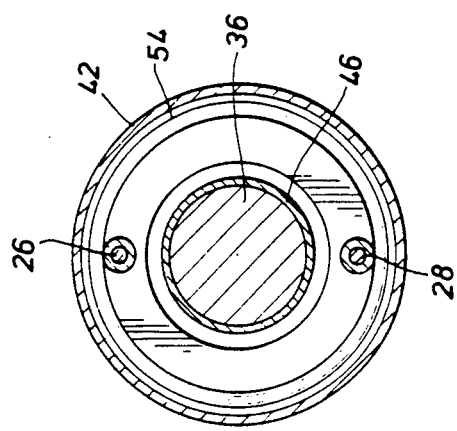
FIG. 4 is a cross-sectional view of the preferred neutron tube of FIG. 3 as seen through line 4—4.

A pair of high voltage insulated anode electrical terminals 26 and 28 pass through the header 40 into the annular cavity 44 defined between the tubular piece 42 and the cylindrical recess wall 46 with end cap 48 adapted to accept the magnet 36 and magnetic pole piece 38 (see FIG. 4). The electrical terminals 26 and 28 then attach to and support a ring anode 50 adjacent to the inner side of the recess end cap 48 and axially aligned within the ion source enclosure 12. In this manner the removable magnet 36 can be advantageously positioned extremely close to the ion source chamber 52.

Figure 5:
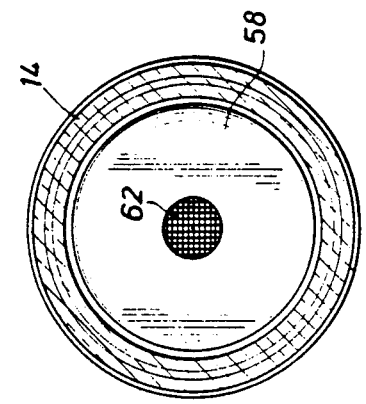
FIG. 5 is a cross-sectional view of the preferred neutron tube of FIG. 3 as seen through line 5—5.

To the right of the ring anode 50 and ion source chamber 52 is a three layered novel ion screen ensemble or shield 54 containing an axially positioned gridded aperture 56. This ion screen ensemble, see FIG. 5, is made up of an outer highly polished thin-walled cover 58 visible through the transparent high voltage insulator 14. On the inner or anode side of the ensemble 54 is a magnetic metal disc 60 that serves several purposes. Disc 60 lends structural support as well as tends to confine the magnetic field to the ion source chamber 52. Disc 60 in combination with the outer cover 58 serves to retain a thin metal grid 62 sandwiched between these pieces and covering the centrally located aperture 56 passing through both the disc 60 and cover 58. The multilayered screen structure is positioned very close to the ring anode such as to optimize the efficiency of extracting ions from the ion source chamber 52. The presence of the grid 62 across the aperture 56 tends to broaden the ion beam resulting in a wider beam of lower power per unit area.

Figure 7:
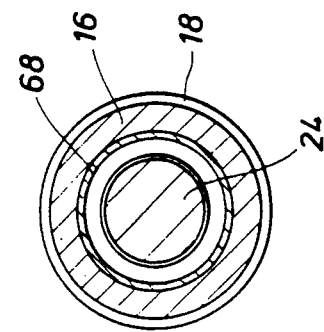
FIG. 7 is a cross-sectional view of the preferred neutron tube of FIG. 3 as seen through line 7—7.
Figure 6:
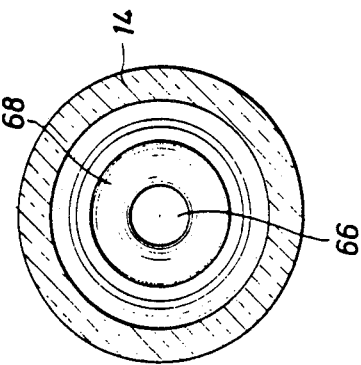
FIG. 6 is a cross-sectional view of the preferred neutron tube of FIG. 3 as seen through line 6—6.

At the other end of the neutron tube is the target thermal conductor 24 in the form of a metallic cylindrical rod penetrating the housing end cap 64 and being held axially suspended within the smaller diameter end of the tube (see FIG. 7). The inner end surface of the conductor 24 is highly polished and contains a thin film of hydride forming metal (preferably titanium) deposited directly on the conductor 24 to serve as the cathode target 66. Displaced to the left of the target 66 is an axially aligned metallic secondary electron emission suppressor 68 containing an axially aligned aperture 70 (see FIG. 6). This suppressor 68 is electrically connected to the exterior suppressor enclosure 16 such that during operation of the neutron generator tube the suppressor 68 can be maintained at an electrical potential a few thousand volts below the cathode target 66 potential such as to attract any secondary electron emission originating from the face of the target as is generally known and practiced in the art.

In selecting materials to build the neutron tube, the ion source enclosure 12 and components surrounding the anode ring should be constructed out of ferromagnetic materials such as to confine the magnetic field to the ion source chamber 52. Preferably magnetic stainless steel 410 or 17-4 is employed for this purpose. The metal to glass insulation junctions are preferably of Kovar to 7052. Thus, cylindrical piece 42 of the ion source enclosure 12, the secondary electron emission suppressor enclosure 16 and the target thermal conductor enclosure 20 are preferably made of Kovar. The stainless steel to Kovar junctions are preferably GTAW welds performed during assembly of the tube in the absence of the removable magnet. All electrical leads and the vacuum tube ports are hermetically sealed before evacuating the tube.

An evacuation or bake out procedure is employed prior to filling the tube with an ionizable gas. This procedure conventionally involves pulling a vacuum on the gas pumping tube 30 while the entire neutron generator tube is being sustained for an extended period of time at an elevated temperature. After the bake out procedure the gas pumping tube 30 is employed to fill the interior of the tube with an ionizable gas such as deuterium or tritium. Preferably a 50/50 mixture of deuterium and tritium is employed. The gaseous mixture is then deposited on the gas replenishing device of FIG. 8 located in the annular cavity 44 in a manner well known in the art.

Figure 8:
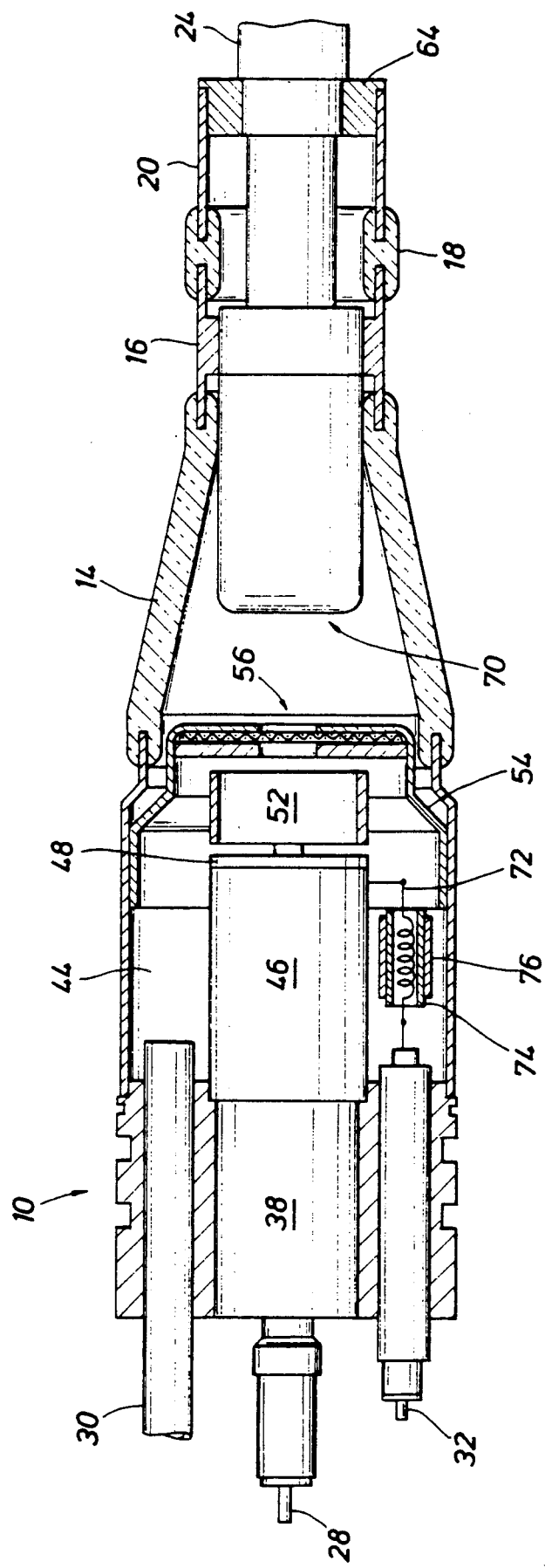
FIG. 8 is a cross-sectional view of the preferred neutron tube of FIG. 2 as seen through line 8—8.

As illustrated in FIG. 8, a heating element 72 surrounded by a ceramic insulator 74 and concentric exterior cylinder of titanium 76 is electrically attached at one end to the ion source gas replenishing terminal 32 after it passes through the header 40 and at the other end is grounded to the recess wall 46. By passing electrical current through the heating element 72, the temperature of the ceramic insulator 74 and titanium sleeve 76 are controlled such as to thermally react the titanium with the gaseous deuterium and tritium producing the hydrides (i.e., the titanium thermally absorbs the hydrogen gas). Since this reaction is thermally reversible the gas pressure can be regulated during the lifetime of the neutron generator tube by merely controlling the temperature of the titanium sleeve 76 containing the deposited hydrides. Having once achieved the desired deposition of the hydrides and proper pressure within the interior of the tube, the neutron generator tube is hermetically sealed by crimp welding the gas pumping tube 30.

The neutron generator tube is now ready to be used. A permanent magnet and magnetic pole piece can be inserted into recessed hole 34 with confidence that the magnetic properties have not been deleteriously affected by the high temperatures associated with fabrication of the tube and the degassification/gassification processes. The external portion of the housing 10 is equipped with O-ring grooves 78 to allow for sealing the tube within a downhole logging tool. In this sense, the overall device is extremely compact and compatible with even the smallest of borehole diameters yet excellent neutron flux densities can be achieved.

In order to operate the tube, a high voltage source and appropriate control circuitry are attached to the anode electrical terminals 26 and 28 and cathode target conductor 24. As is known in the art, a high voltage of the order of 100 K volts or even greater is applied across the ring anode and target cathode, whereupon free electrons originating at the cathode are accelerated into the ion chamber, and in response to the presence of the magnetic field induced spiral path, collide and ionize the tritium and deuterium present in the ion chamber. The resulting tritium and deuterium nuclei (positive ions) are then extracted (by virtue of the electrical potential) from the ion chamber and are accelerated towards the cathode. Upon collision with the hydrogen-containing target (i.e., deuterium and tritium occluded titanium target) the desired neutron releasing nuclear reaction takes place; i.e., the d,d reaction emits neutrons of approximately 2.5 MeV and the d,t reaction emits neutrons of approximately 14 MeV.

Conventionally for well logging purposes, the neutron emission is performed on a pulsed basis with approximately a 5 to 10 percent duty cycle. However, the neutron source of the present invention has also been successfully used in a sustained continuous neutron emission mode of operation.

The use of a 50 percent deuterium and 50 percent tritium mixture as the ionizable gas is preferred in that this mixture is (as known in the art) a self-replenishing hydride source; however, other mixtures of the hydrogen isotopes are acceptable alternatives and should be considered equivalent for purposes of this invention. The target replenishing procedure in the present invention can be periodically performed by removing the magnet and placing the entire neutron generator tube in an oven at the appropriate temperature to form the deuterium and tritium hydrides of titanium.

An electrical current is then used to heat the element 76 attached to the ion source gas replenishing terminal 32 (see FIG. 8) to a temperature characteristic of reversing the titanium hydride formation reaction. In this manner, net migration of occluded hydrides of deuterium and tritium from the titanium sleeve 76 to the titanium target 70 and reestablishing the desired ionizable gas pressure within the tube is accomplished, again without deleteriously affecting the permanent magnet. Thus the lifetime of the neutron generator tube can be extended to several hundred hours.

An improved neutron tube, as illustrated in the drawing, having an external housing diameter of the order of about 27 mm and nominally designed to operate at borehole temperatures of 200° C. with neutron flux of $10^8$ neutrons per second or greater, has been successfully tested at temperatures as high as 190° C. with negligible thermal effects. In contrast to the prior art devices, no thermally induced degradation of the exothermal hydrogen absorber target was observed. Several critical features of the present invention are felt to contribute this success.

The fact that the permanent magnet can be withdrawn from the neutron generator tube during fabrication, degassification, gassification and gas replenishing, allows for optimum preservation of permanent magnetic properties during periods when the tube is subjected to ultra-high temperatures. It further allows the use of highly temperature-sensitive magnets which otherwise would be inoperative. Thus, the concept of providing for a removable magnet of the present invention can be advantageously employed with generally any previously known permanent magnetic material as well as the preferred samarium/cobalt magnet. And, because of the optimization of the magnetic field strength, the overall physical dimensions of the tube can be minimized without sacrificing the efficiency of the ion source and the desired narrow pulse width of the neutron emission.

This overall compactness of the tube is viewed as being critical and advantageous in the sense of making the tube capable of being used in even the smallest oil and gas well borehole. Good thermal contact of the target surface with the outside wall is considered necessary for the successful operation of the neutron generator tube. Thus the presence of the thermally conductive target support preferably having a cross-section of substantially the same size as the target wherein one end of the support contains the target and is within the tube and the other end extends outside the tube will advantageously assist in removing thermal energy from the target. Thus the target support can be fabricated from any thermally conductive inert metal. Preferably a low oxygen containing copper (OFHC) rod is employed. The target end is highly polished and a film of hydrogen absorbtive metal is deposited to serve as the target. Generally any of the well known metallic target materials can be employed for this purpose; however, a titanium film of about 5 to 10 microns deposited on the OFHC copper is preferred. Because of the above advantages, a temperature gradient between the target and the outside of the tube of about 30° C. is anticipated at downhole operating conditions.

The presence of the ion pervious grid in the ion screen ensemble near the anode ring of the Penning ion source is considered critical in that it affords a wide ion beam of reduced power per unit area impinging on the target. Consequently the occurrence of localized hot spots on the target is alleviated and the tendency toward thermal degradation of the target is diminished. The ion grid can be made of any inert conductive material structurally capable of spanning the axially oriented aperture. Preferably the screen itself is made of etched tungsten, and as previously mentioned, the screen preferably is sandwiched between a magnetic disc on the inside (ring anode side) and a thin highly polished metallic disc on the target side.

It has been discovered that an etched tungsten film of about 0.002 to 0.005 inch thick with the openings representing about 90 percent of the surface area, covering about a ⅛th inch diameter aperture, and positioned within about 0.030 inch of the anode ring of a neutron generator tube as illustrated in the drawing will result in an ion extraction efficiency of better than 40 percent of the ion formed. It has further been demonstrated that ignition or light-off of the ion source will occur at as low as 300 volts potential drop between the ring anode and target cathode when the ion screen is grounded. It is felt that the electric field penetration of the screen and thus the time of ignition of the ion source can be controlled by providing the ion screen with a means to externally vary the relative potential of the ion screen. In this manner the pulsing neutron generator could be more accurately controlled than previously known methods involving timed ultrahigh voltage circuitry.

Having thus described the preferred embodiments of the invention with a certain degree of particularity, it is manifest that many changes can be made in the details of the construction and the arrangement of components without departing from the spirit and scope of this disclosure. For example, the overall design and shape of the neutron generator housing does not have to be cylindrically symmetric about the longitudinal axis of the tube and the specific and relative sizes of the components thereof can be readily varied. Therefore, it is to be understood that the invention is not limited to the embodiments set forth herein for purposes of exemplification, but is to be limited only by the scope of the attached claims including a full range of equivalents to which each element thereof is entitled.

I claim:

1. A neutron generator tube comprising:
   (a) a hermetically sealed housing containing an ionizable gas;
   (b) an axial recess in one end of said housing adapted to receive a magnet;
   (c) a ring anode axially oriented within said housing adjacent to said recessed end for accepting said magnet;
   (d) an axially oriented thermal conductor cathode penetrating through the other end of said housing wherein the inner surface of said cathode contains a target;
   (e) an ion screen ensemble near said anode ring and between said anode ring and cathode target wherein said ion screen ensemble contains an axially positioned gridded aperture wherein said aperture is substantially smaller than said anode ring and target and wherein said ion screen ensemble further comprises:
      (i) a highly polished thin-walled cover on the cathode side,
      (ii) a magnetic metal disc on the anode side, and
      (iii) a thin metal grid sandwiched between said cover and disc such that an electrical potential may be externally superimposed on said ion screen ensemble and be varied relative to the potentials of said ring anode and cathode such as to assist in the extraction of ions from the ion source; and
   (f) an electron shield near said cathode target and between said ion screen ensemble and cathode target wherein said electron shield contains an axially positioned aperture.

2. A neutron generator tube of claim 1 further comprising a removable magnet adapted to fit into said axial recess.

3. A neutron generator tube of claim 2 wherein said removable magnet is a samarium/cobalt magnet.

4. A neutron generator tube of claims 1 or 2 wherein said thermal conductor cathode has a cross-section of substantially the same size as the target and wherein the end of said cathode containing the target is within said housing and the other end extends outside said housing such as to remove thermal energy from said target.

5. A neutron generator tube of claim 4 wherein said thermal conductor cathode is a OFHC copper rod having a film of titanium deposited on a polished end of said rod to serve as said target.

6. A neutron generator tube of claims 1 or 2 wherein said ion screen ensemble is an electrically conductive, grounded surface.

7. A neutron generator tube of claim 6 wherein said gridded aperture is a screen of etched tungsten of about 0.002 to 0.005 inch thick with the openings representing about 90 percent of the surface area.

8. In a neutron generator tube containing an ion source involving a ring anode and cathode sealed in an ionizable gas wherein a magnetic field axially aligned with said ring anode is used, the improvement comprising:
   (a) providing said neutron generator tube with an axially aligned recess adapted to accept a removable magnet wherein said recess terminates internal to said tube substantially adjacent to one side of said ring anode; and
   (b) a removable magnet adapted to fit into said recess.

9. A neutron generator tube of claim 8 wherein said removable magnet is a samarium/cobalt magnet.

10. In a neutron generator tube containing an ion source involving a ring anode and a cathode target sealed in an ionizable gas, the improvement comprising: a thermally conductive target support having a cross-section of substantially the same size as the target and wherein the end of said support containing the target is within said tube and the other end extends outside the tube such as to remove thermal energy from said target, said thermally conductive target support further comprising an OFHC copper rod having a film of titanium deposited on the polished end of said rod to serve as said target.

11. In a neutron generator tube containing an ion source involving a ring anode with a magnetic field axially aligned with said ring anode and a cathode target axially aligned to said ring anode sealed in an ionizable gas, the improvement comprising: an ion screen ensemble positioned between said ring anode and said cathode target containing an axially aligned gridded aperture wherein said ion screen ensemble is a multilayered structure consisting of a highly polished outer layer facing said target, a ferromagnetic structural inner layer, and a metallic gridded intermediate layer covering said aperture.

12. A neutron generator tube of claim 11 wherein said metallic grid is a screen of etched tungsten of about 0.002 to 0.005 inch thick with the openings representing about 90 percent of the surface area.

* * * * *